United States Patent [19]

Marteau d'Autry

[11] Patent Number: 4,790,176

[45] Date of Patent: Dec. 13, 1988

[54] PROCESS AND DEVICE FOR CALIBRATING A SAMPLING AND METERING PIPETTE

[76] Inventor: Eric Marteau d'Autry, 72, rue Gambetta, 95400 Villiers-le-Bel, France

[21] Appl. No.: 942,392

[22] Filed: Dec. 16, 1986

[30] Foreign Application Priority Data

Nov. 27, 1986 [FR] France ................................ 86 16574

[51] Int. Cl.⁴ ........................ G01F 25/00; B01L 3/00; G01N 1/14

[52] U.S. Cl. .................................. 73/1 H; 73/864.18

[58] Field of Search ........... 73/1 H, 3, 864.18, 864.16, 73/864.13, 864.17; 364/571

[56] References Cited

U.S. PATENT DOCUMENTS

| | | | |
|---|---|---|---|
| 3,343,539 | 9/1967 | Moorhouse | 73/864.18 X |
| 3,613,952 | 10/1971 | Gilmont et al. | 73/864.18 X |
| 3,882,729 | 5/1975 | Roach | 73/1 H X |
| 4,096,750 | 6/1978 | Sturm | 73/864.18 |
| 4,098,125 | 7/1978 | Lee | 73/864.18 X |
| 4,165,646 | 8/1979 | Shopiro | 73/864.18 X |
| 4,250,755 | 2/1981 | Kenney | 73/864.18 X |
| 4,362,063 | 12/1982 | d'Autry | 73/864.18 X |
| 4,501,163 | 2/1985 | MacDermott et al. | 73/864.18 X |
| 4,671,123 | 6/1987 | Magnussen, Jr. et al. | 73/864.18 X |
| 4,672,857 | 6/1987 | MacDermott | 73/864.18 |

FOREIGN PATENT DOCUMENTS

| | | | |
|---|---|---|---|
| 9013 | 3/1980 | European Pat. Off. | |
| 14120 | 8/1980 | European Pat. Off. | |
| 67605 | 12/1982 | European Pat. Off. | |
| 2330499 | 1/1975 | Fed. Rep. of Germany | 73/1 H |
| 3137423 | 3/1983 | Fed. Rep. of Germany | |
| 57542 | 5/1980 | Finland | 73/864.18 |
| 542547 | 1/1977 | U.S.S.R. | 73/864.18 |

*Primary Examiner*—Tom Noland
*Attorney, Agent, or Firm*—Mason, Kolehmainen, Rathburn & Wyss

[57] ABSTRACT

The invention relates to a process and a device for calibrating a sampling and metering pipette and a pipette adapted to be used in the process with the device. The volume of the sampling chamber of the pipette is adjusted to zero by means of a knurled button (3) and an adjusting screw (7) is actuated to set the stroke of a plunger for taking a sample at a zero value. The volume of the sample chamber is adjusted by means of the knurled button (3) to determine a mean value of the sample volume, and a new adjustment of the brake screw (7) is made to a value corresponding to the difference between a displayed volume value and the mean value of the sample volume.

9 Claims, 3 Drawing Sheets

PROCESS AND DEVICE FOR CALIBRATING A SAMPLING AND METERING PIPETTE

BACKGROUND OF THE INVENTION

1. Field of the Invention

The present invention relates to a process and a device for calibrating a sampling and metering pipette and to a pipette permitting a completely automatic implementation of the process forming the subject of the invention.

2. Description of the Related Art

Sampling and metering pipettes which are available commercially at the present time, as shown in FIG. 1, comprise a pipette body 1 enabling the sample volume to be displayed. The sample volume is produced by a plunger 4 integrally fastened to a central rod 5, the plunger being movable in the pipette body 1 under the action of the central rod and the reaction of a return spring 6. An axial adjusting screw 2 meshes with the means 20 for displaying the sample volume, the adjusting screw being integrally fastened to a knurled button 3 permitting the stroke of the plunger in the pipette body to be adjusted. The central rod 5, and the plunger under the reaction of the return spring, comes normally into abutment on a positionally adjustable end-stop 7 at the end of the knurled button 3 in order to enable the zero setting of the stroke of the central rod 5 and of the plunger and, consequently, of the sample volume, to be adjusted.

For a more detailed description of a pipette such as described above, reference may usefully be made to French Patent Application No. 80/00,130, filed on Jan. 4, 1980 in the name of the same applicant and entitled DEVICE FOR SAMPLING AND DISPENSING ADJUSTABLE VOLUMES OF LIQUIDS WITH NUMERICAL DISPLAY.

To this day, this type of pipette has been wholly satisfactory both from the viewpoint of reliability in use and of the reproducibility of repetitive measurements or meterings.

However, before an apparatus of this kind is marketed, the unit needs to be calibrated, this calibration consisting, in effect, of a setting or adjustment of the zero of the sample volume.

Because of the actual structure of the system for setting or adjusting the zero of the sample volume, the above-mentioned calibration operations can only be successfully carried out by hand, obviously, and production of pipettes of this kind on an industrial scale involves, before they are launched on the market, the installation of a calibration station which is costly in manpower and in hardware, in order to ensure sufficient production. In addition, the essentially manual nature of the above-mentioned calibration operation cannot ensure a complete freedom from mistakes or faults in setting or in calibration, precisely because of the human factor, which is an unavoidable source of mistakes and of inaccuracy, a reduction in errors of this type requiring, for example, additional statistical control operations or the like.

SUMMARY OF THE INVENTION

The purpose of the present invention is to overcome the above-mentioned disadvantages by the implementation of a process and of a device for calibrating a sampling and metering pipette, and a pipette which is specially adapted to a completely automatic calibration.

Another subject of the present invention is the implementation of a process and of a device for calibrating a sampling and metering pipette, from which human involvement is substantially eliminated, the process being conducted automatically with the aid of the device which is the subject of the invention.

Another subject of the present invention is also the implementation of a process and of a device for calibrating a sampling and metering pipette which makes it possible to obtain a very high accuracy and a very high uniformity of calibration in very large batches of pipettes which are subjected to the process.

The pipette forming the subject of the invention is noteworthy in that there is provided a central rod biased under the reaction of the return spring to abut an end-stop at the end of an adjusting screw comprising a knurled button. The end-stop consists of a brake screw for adjusting the zero setting of the volume of the sampling chamber positionally adjustable in translation in relation to the end of the adjusting screw and to the knurled button by means of a rotary motion.

The process and the device for calibrating a sampling and metering pipette, which form the subject of the invention, are noteworthy in that they consist in, or successively lead to, (1) adjusting the volume of a sampling chamber to zero by means of a knurled button, and then actuating an adjusting brake screw to reduce the piston stroke substantially to zero, (2) adjusting the volume of the sampling chamber to a small, non-zero volume, and then performing a plurality of samplings of the above-mentioned volume of a reference substance, (3) obtaining (following a test for the consistency of the plurality of above-mentioned samplings) a mean of the values calculated from the volumes of the plurality of the above-mentioned samplings, (4) performing a new adjustment of the adjusting brake screw by a number of turns corresponding in value and in sign to the difference between the value of the displayed volume and the above-mentioned mean value.

The invention finds an application in the adjustment or calibration of sampling devices or pipettes in accordance with the invention.

BRIEF DESCRIPTION OF THE DRAWING

It will be understood better by reading the description and inspecting the drawings which follow, in which.

FIG. *2a* shows, in section along a lengthwise plane of symmetry, a view relating to a sampling and metering pipette in accordance with the present invention;

FIG. *2b* shows a partial view of FIG. *2a;*

Figure 3:
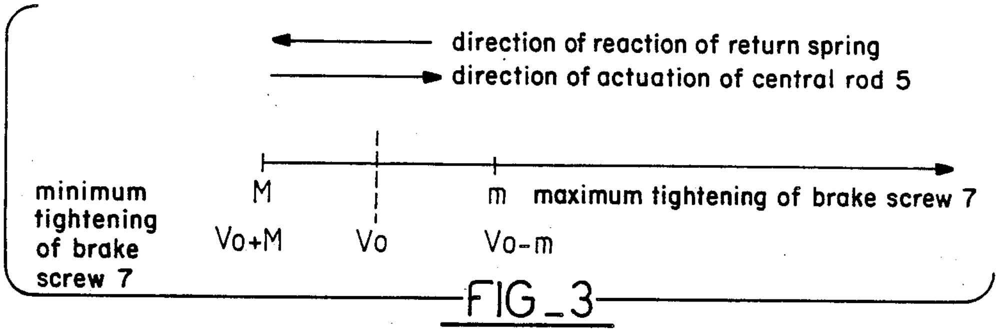
Figure 4:
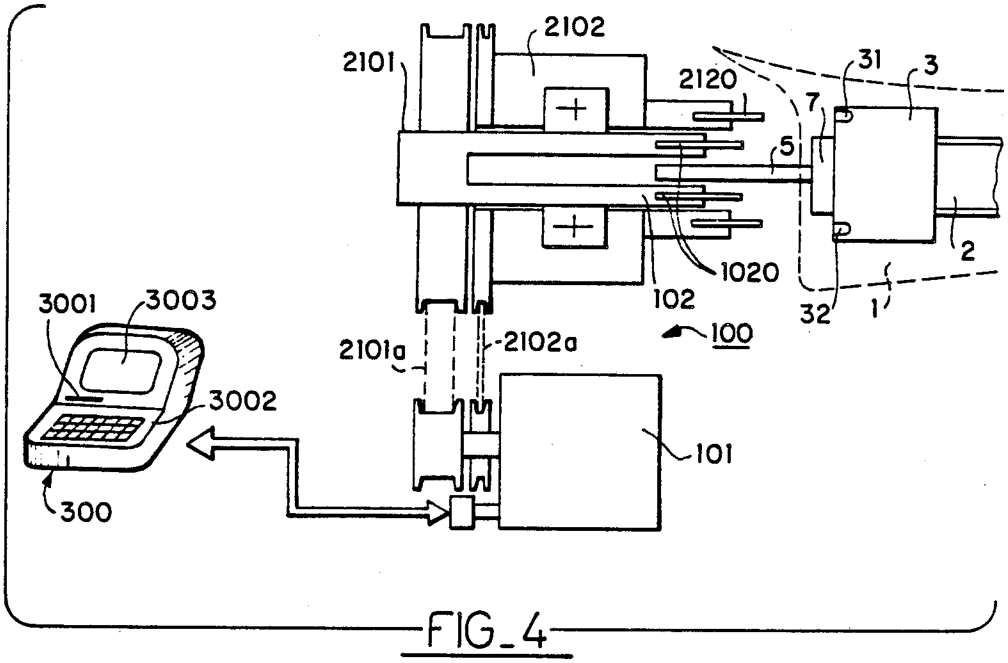

FIG. 3 shows a diagram illustrating the calibration process forming a subject of the invention; and FIG. 4 shows in cross-section a diagram illustrating a calibration device in accordance with the present invention, the device being advantageously capable of permitting the implementation of the process forming a subject of the invention.

DESCRIPTION OF A PREFERRED EMBODIMENT OF THE INVENTION

A sampling and metering pipette in accordance with the subject of the invention will first be described in conjunction with FIG. 2*a*.

Figure 1:
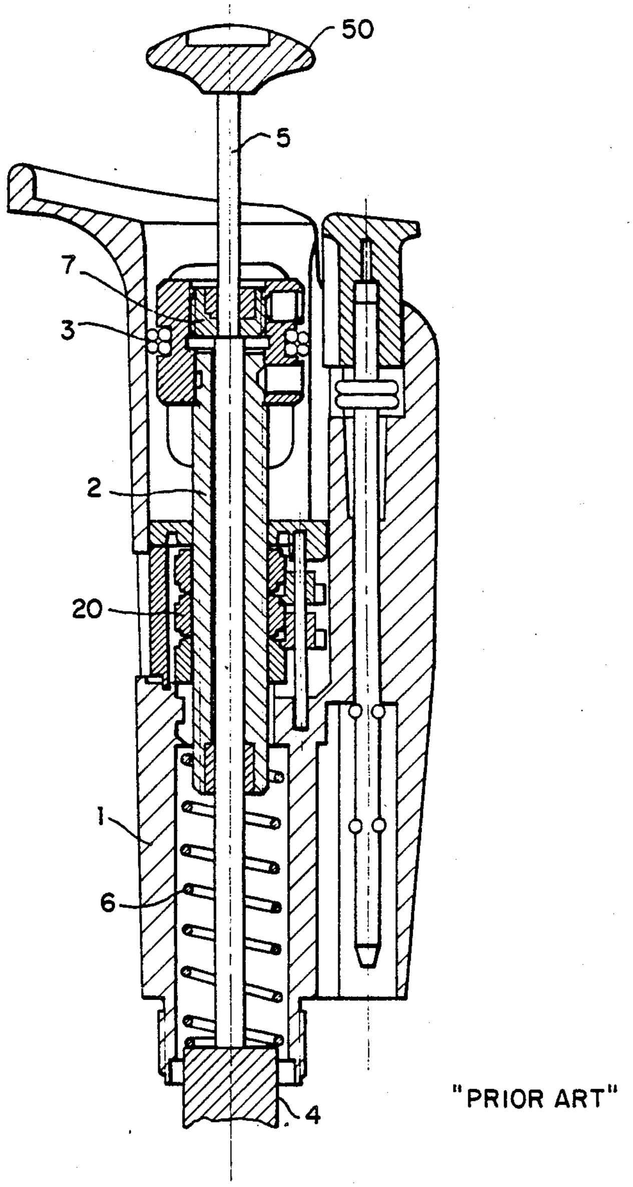
FIG. 1 shows, in section along a lengthwise plane of symmetry, a view relating to a sampling and metering pipette of the prior art.

According to the above-mentioned figure, the sampling and metering pipette forming a subject of the invention comprises, in a manner similar to the pipette of the prior art, such as shown in FIG. 1, a pipette body 1 with display of the sample volume, an adjusting screw 2 meshing with the means for displaying the sample volume, the adjusting screw being integrally fastened to a knurled button 3 to permit the adjustment of the volume of a sample chamber formed by a plunger 4 integrally fastened to a central rod 5. The plunger 4 is movable in the pipette body 1 under the action of the central rod and the reaction of a return spring 6.

In accordance with the invention, the central rod 5, under the reaction of the return spring 6, moves into abutment with a knurled button 3 at the end of the adjusting screw 2. The knurled button 3 engages an end-stop advantageously consisting of a brake screw 7 for adjusting the zero of the volume of the sampling chamber. The brake screw 7 can be adjusted in a position of translation relative to the end of the adjusting screw 2 and to the knurled button 3, for example, by a rotary motion.

According to an advantageous embodiment, the brake screw 7 may comprise a threaded member 70 engaged in a tapping provided in a housing in the knurled button 3. A friction member 71 forming a brake against the wall of the housing is additionally provided.

Furthermore, mechanical means such as recesses 72 are arranged on an outer face of the threaded member 70, said outer face being perpendicular to an axis Δ of the mechanical means of the threaded member forming the endless brake screw 7.

Figure 2A:
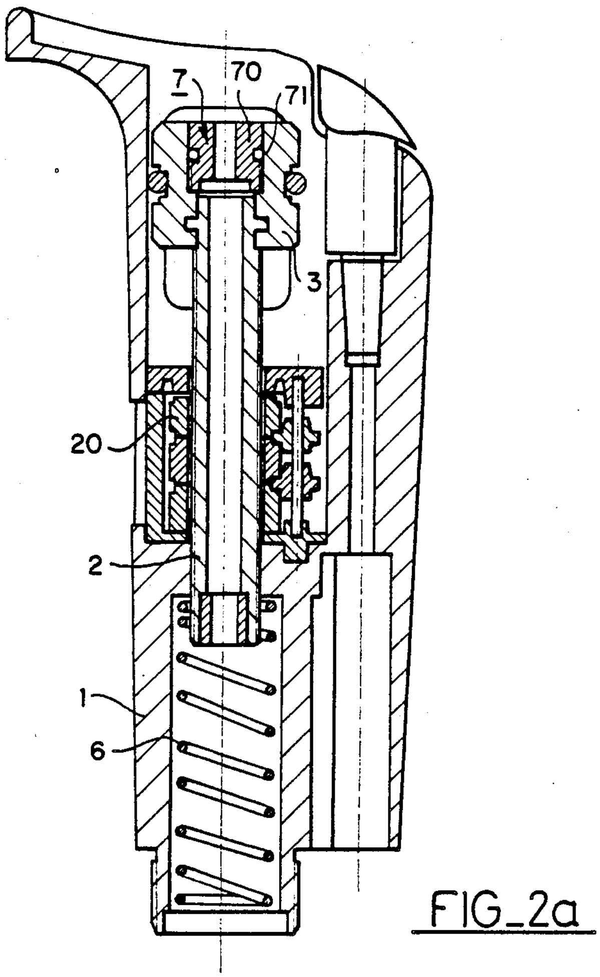
Figure 2B:
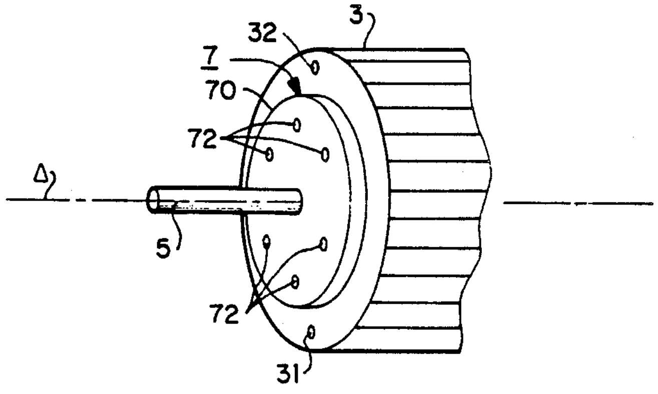

As shown in FIG. 2*b*, without implying any limitation, the slots 72 arranged on the outer face of the threaded member 70 may advantageously consist of a plurality of holes arranged, for example, in a circular pattern on the above-mentioned outer face. These holes are intended to permit the adjusting brake screw 7 to be driven by means of a tool specially adapted for this purpose, which will be described later in the description.

In addition, the friction member 71 forming a brake may be arranged advantageously between the outer face of the threaded member and a thread intended to be engaged in the tapping of the housing of the knurled button 3. The friction member 71 may advantageously consist of a ring made, for example, of rubber, or a ring made of a supple material, enabling the threaded member to be locked in relation to the knurled button 3 when no rotation-producing torque is being applied to the threaded member 70.

An advantageous embodiment of the process for calibrating a sampling and metering pipette in accordance with the invention will be described in conjunction with FIG. 3, however, before the description of the process forming a subject of the invention, a brief reminder of the operation of the pipette, as shown in FIG. 2*a*, for example, will be given.

Actuation of the knurled button 3 by the operator enables the latter to adjust the stroke of the central rod 5 and of the plunger 4 and finally to choose the sample volume defined by the stroke of the plunger 4 in the pipette body 1. The stroke is determined by the distance between a rest position of the plunger 4 and the end of the pipette body 1, which is not shown in the drawing. The adjustment of the stroke of the plunger and central rod 5 is performed by turning an adjusting screw 2 by means of the knurled button 3, in relation to the pipette body 1. As the screw is adjusted, the knurled button 3, the central rod 5 and the plunger 4 move in translation along the lengthwise axis of symmetry of the pipette. In addition, because the adjusting screw 2 meshes with the means for displaying the sample volume 20, this volume is displayed directly in a window provided in the pipette body. Understandably, of course, the adjustment of the zero setting of the sample volume may be produced by adjusting the relative position of the positionally adjustable end-stop 7 in relation to the knurled button or the adjusting screw 2. When the choice and the display of the sample volume have thus been performed by the operator, as described earlier, the latter can then actuate the central rod 5 by means of a push-button 50, so as to bring the plunger 4 into abutment against the end of the pipette body (not shown) as illustrated in FIG. 1. When the operator stops pressing the push-button 50, a return spring 6 then permits the assembly consisting of the plunger 4 and the central rod 5 to return to its original position, thus performing the sampling and the metering of the substance to be sampled.

In accordance with an advantageous aspect of the process forming a subject of the invention, the process consists, in a first step, in adjusting the volume of the sampling chamber to zero by means of the knurled button 3, and then actuating the adjusting brake screw 7, to return the stroke of the plunger substantially to zero. From the diagram shown in FIG. 3 it will be understood that for a setting of the sample volume marked Vo effected by means of the knurled button 3, the positional adjustment of the adjusting brake screw 7 along a lengthwise axis of the pipette body, marked Δ, corresponding in fact to a positional adjustment of the end-stop of the equipment consisting of the central rod 5 and the plunger 4. This makes it possible in fact to obtain an effective adjustment of the sample volume Vo, included between Vo+M for an extreme projecting position of the brake screw 7 in relation to the knurled button 3, representing a volume marked Vo+M in the diagram in FIG. 3, and a minimum sample volume marked Vo−m, corresponding to the position of the brake screw 7 which is marked m, when the screw 7 is screwed to its maximum into the housing provided for this purpose in the knurled button 3. Choosing a substantially zero sample volume Vo, the knurled button 3 is adjusted with the positioning of the adjusting brake screw 7 at the position m, defined earlier, and this establishes a substantially zero stroke of the plunger.

In accordance with the process forming a subject of the invention, the volume of the sampling chamber is then set at a value corresponding to a non-zero sample volume. A plurality of samplings of the above-mentioned volume of a reference substance can then be performed.

In order to guarantee a high reliability of calibration of the process forming a subject of the invention, a test for consistency of the plurality of the above-mentioned samplings may then advantageously be carried out. A mean value calculated from the volumes of the plurality of the above-mentioned samplings can then be determined, this mean enabling a mean value of the sample volume to be defined.

A new adjustment of the adjusting brake screw 7 is then performed, the brake screw 7 being then driven in rotation by a number of turns corresponding in value and in sign to the difference between the value of the volume displayed by the display means of the pipette body 1 and the above-mentioned mean value of the sample volume. It is obvious that the adjustment by a number of turns corresponding in value and in sign to the difference between the displayed volume value and the above-mentioned mean value may consist of a fraction of screw turns of the adjusting brake screw 7.

According to another advantageous characteristic of the process forming a subject of the invention described earlier, following the step consisting in performing the new adjustment of the adjusting brake screw 7, the pipette may advantageously be subjected to a check by means of multiple samplings permitting either the acceptance of the pipette as a calibrated pipette, or the recommencement of the process at the preceding step, a step consisting in the determination of a mean value of the volumes of the plurality of samplings.

According to an advantageous characteristic of the process of the invention, the consistency test may comprise accepting each of the samples forming the plurality of samplings if it lies within a range of scatter determined in relation to a reference value. The values of the volumes of the plurality of multiple samplings may be advantageously calculated gravimetrically.

The reference substance may consist of any non-volatile substance.

In the case where the difference between the displayed volume value and the mean value of the multiple samplings is greater than a determined tolerance value, the pipette my be subjected to a calibration correction in accordance with the steps described earlier in the description, steps comprising the determining a mean of these samplings after a test for consistency of the plurality of the above-mentioned samplings, and then performing a new adjustment of the adjusting brake screw 7, by a number of turns corresponding in value and in sign to the difference between the displayed volume value and the displayed mean value.

A device for calibrating a sampling and metering pipette according to the process forming a subject of the invention will now be described in conjunction with FIG. 4.

In accordance with this figure, the device forming a subject of the invention comprises motor means marked 100 for driving the brake screw 7 and the knurled button 3. Control means 300 is also provided, in order to permit the control of the motor means 100 for driving the brake screw 7 and the knurled button 3. The motor means 100 may advantageously include drive pins 1020 adapted to couple mechanically with the mechanical means 72 provided on the outer face of the threaded member 70. These pins make it possible to apply a torque producing a rotation of the threaded member 70 of the brake screw 7. Advantageously, a plug with pins 102 may comprise a head end of a rod body 2101 in which the central rod 5 of a pipette is engaged. The rod body 2101 may, advantageously, be mounted rotationally movable in relation to a ball-bearing member 2102. In order to constitute means for rotatively driving the knurled button 3, the member 2102 also includes drive pins 2120 adapted to engage in corresponding orifices, marked 31, 32, provided on the knurled button 3. This engagement is effective to immobilize or to drive the knurled button 3, with the member 2102, before an adjustment operation, by screwing the brake screw 7 in or out. The driving means 100 additionally comprises a driving motor 101 coupled by means of a clutch transmission of a conventional type, for example, includes driving belts 2101*a* and 2102*a*, respectively, connected to the rod body 2101 and to the member 2102.

Thus, as has been shown diagrammatically in FIG. 4, the means 300 for controlling the means 100 for driving the brake screw may consist of a microcomputer equipped with its peripherals. Peripherals mean, of course, a permanent memory 3001 of the magnetic base memory type, a keyboard 3002 for interfacing with an operator and a display monitor 3003, permitting an interactive dialog between the operator and the whole system. The implementation of the calibration process which is a subject of the invention, by means of the device as shown in FIG. 4, will now be described.

When the pipette has been positioned opposite the device 100 and the pins 1020 of the plug 102 are aligned with the slots 72 and the pins 2120 of the head of the member 2102 are aligned with the orifices 31 and 32, in a first step, the volume of the sampling chamber is adjusted to zero by means of the knurled button 3, via the motor 101 and the pins 2120 of the member 2102, the purpose of the latter pins being to rotatively drive the knurled button 3. The adjusting brake screw 7 is then rotated by means of the plug 102 with pins 1020, to set the stroke of the plunger substantially at zero. The minimum sample volume marked Vo-Vm, corresponding to the position m of the brake screw 7 screwed to its maximum into its housing provided in the knurled button 3, is set for a substantially zero volume Vo and this enables a substantially zero plunger stroke to be determined.

The volume of the sampling chamber is then adjusted by rotating the knurled button 3, via the motor 101 and the member 2102 and the pins 2120, in order to determine a mean value of the sample volume.

A new adjustment of the adjusting brake screw 7 is performed by rotating the latter by means of the motor 101 and the plug with pins 1020, by a number of turns corresponding in value and in sign to the difference between the value of the volume displayed by the display means of the pipette body 1 and the above-mentioned mean value of the sample volume.

This described embodiment of the process comprising the subject of the invention is given merely by way of example, without any limitation being implied. The process of calibration of a sampling and metering pipette forming a subject of the invention, and the device enabling this process to be implemented, are particularly noteworthy in that, at the cost of a low expenditure on hardware, they permit a highly accurate control of the calibration of a sampling and metering pipette, as well as a very high uniformity of calibration covering a very large batch of pipettes intended to be marketed.

What is claimed is:

1. A process for calibrating a sampling and metering pipette of the type comprising a pipette body (1) having a display of a sample volume, an adjusting screw (2), a knurled button (3) for adjusting the volume of a sample chamber holding the sample volume and a brake screw (7) for adjusting the zero setting of the volume display of the sampling chamber, the adjusting brake screw (7) forming an end-stop adjustable in relation to the knurled button (3) for a central rod (5) integrally fastened to a plunger (6) whose stroke in the pipette body determines the sample volume, which process consists of the following steps:

(a) adjusting the volume of the sampling chamber to zero by means of the knurled button and then actuating the adjusting brake screw (7) to set the stroke of the plunger substantially at zero, (b) adjusting the volume of the sample chamber at a low nonzero volume and then performing a plurality of samplings of the abovementioned volume of a reference substance.

(c) determining a mean of the calculated values of the volumes of the plurality of the abovementioned samplings, following a test for consistency of the plurality of abovementioned samplings, and (d) performing a new adjustment of the adjusting brake screw (7) by a number of turns corresponding in value and in sign to the difference between the displayed volume value and the abovementioned mean value.

2. The process as claimed in claim 1, wherein, after the step (d) is completed, the said pipette is subjected to a check by means of multiple samplings permitting either the acceptance of the pipette as a calibrated pipette or the recommencement of the process at step (c).

3. The process as claimed in claim 1, wherein the consistency test of step (c) comprises:

accepting each of said samples forming the plurality of samplings, if each said sample lies within a range of scatter determined in relation to a reference value.

4. The process as claimed in claim 1, wherein the values of the volumes of the plurality of multiple samplings are calculated gravimetrically.

5. A device for calibrating a sampling and metering pipette, said pipette of the type comprising:

a pipette body (1) including a sampling chamber and means for displaying the volume of a sample contained therein;

an adjusting screw (2);

a knurled button (3) for adjusting the volume of said sample chamber;

a brake screw (7) including mechanical drive means thereon for adjusting a zero setting of the volume of said sampling chamber;

a plunger (4) reciprocally mounted in said body and whose stroke in the pipette body determines the sample volume;

a central rod (5) integrally fastened to said plunger;

said brake screw (7) forming an end-stop adjustable in relation to said knurled button (3) which is mounted on said rod;

said device employing the calibrating steps comprising:

(a) adjusting the volume of said sampling chamber to zero by means of said knurled button and then actuating said adjusting brake screw (7) to set the stroke of said plunger substantially at zero;

(b) adjusting the volume of said sample chamber at a low non-zero volume and then performing a plurality of samplings of the above-mentioned volume of a reference substance;

(c) determining a mean of the calculated values of the volumes of the plurality of the above-mentioned samplings, following a test for consistency of the plurality of above-mentioned samplings, and (d) performing a new adjustment of said adjusting brake screw (7) by a number of turns corresponding in value and in sign to the difference between the displayed volume value and the above-mentioned mean value;

said device further including:

means (100) for driving said brake screw (7) and said knurled button (3); and means (300) for controlling said means for driving said brake screw (7) and said knurled button (3).

6. The device as claimed in claim 5, wherein the said means (100) for driving said brake screw (7) and said knurled button (3) comprises:

a driving motor (101), a plug with pins (102), coupled to the driving motor, the said pins forming a male counterpart to said mechanical drive means of a threaded member formed on said brake screw (7), and a member (2102) rotationally movable around the plug with pins (102), the said member (2102) being itself coupled to the driving motor (101) and fitted with pins (2120) which are adapted to engage into corresponding orifices (21, 32) of the knurled button (3) in order to rotate the latter.

7. The device as claimed in claim 5, wherein the said control means (300) consists of a microprocessor.

8. The device as claimed in claim 7, wherein said microprocessor includes a memory in which the commands for controlling the device for implementing said calibrating steps are stored.

9. A sampling and metering pipette comprising a pipette body (1) having means for the display (20) of a sample volume, an adjusting screw (2) meshing with said means for displaying said sample volume, said adjusting screw being integrally fastened to a knurled button (3) to make it possible to adjust the volume of a sampling chamber produced by a plunger (4) integrally fastened to a central rod (5), said plunger being movable in said pipette body (1) under the action of said central rod and the reaction of a return spring (6) acting on said central rod (5), said return spring acting on said central rod to abut on an end-stop at the end of said adjusting screw comprising said knurled button (3), said end-stop comprising a brake screw (7) for adjusting the zero setting of the volume of said sampling chamber, said brake screw (7) being positionally adjustable in translation in relation to the end of said adjusting screw and said knurled button (3) by means of a rotary motion, wherein said brake screw (7) comprises:

a threaded member (70) engaged in a tapping provided in a housing formed in said knurled button (3), a friction member (71) between said threaded member and said wall of said housing forming a rotational brake therebetween, and mechanical drive means (72) arranged on an outer face of said threaded member (70) that is perpendicular to a central axis of said central rod, said mechanical drive means effective for rotation of said threaded member forming the brake screw (7) relative to said knurled button (3).

* * * * *